May 17, 1938.   J. L. McWEENY   2,117,441
INDICATING AND CONTROL APPARATUS
Filed Nov. 27, 1936   2 Sheets-Sheet 1
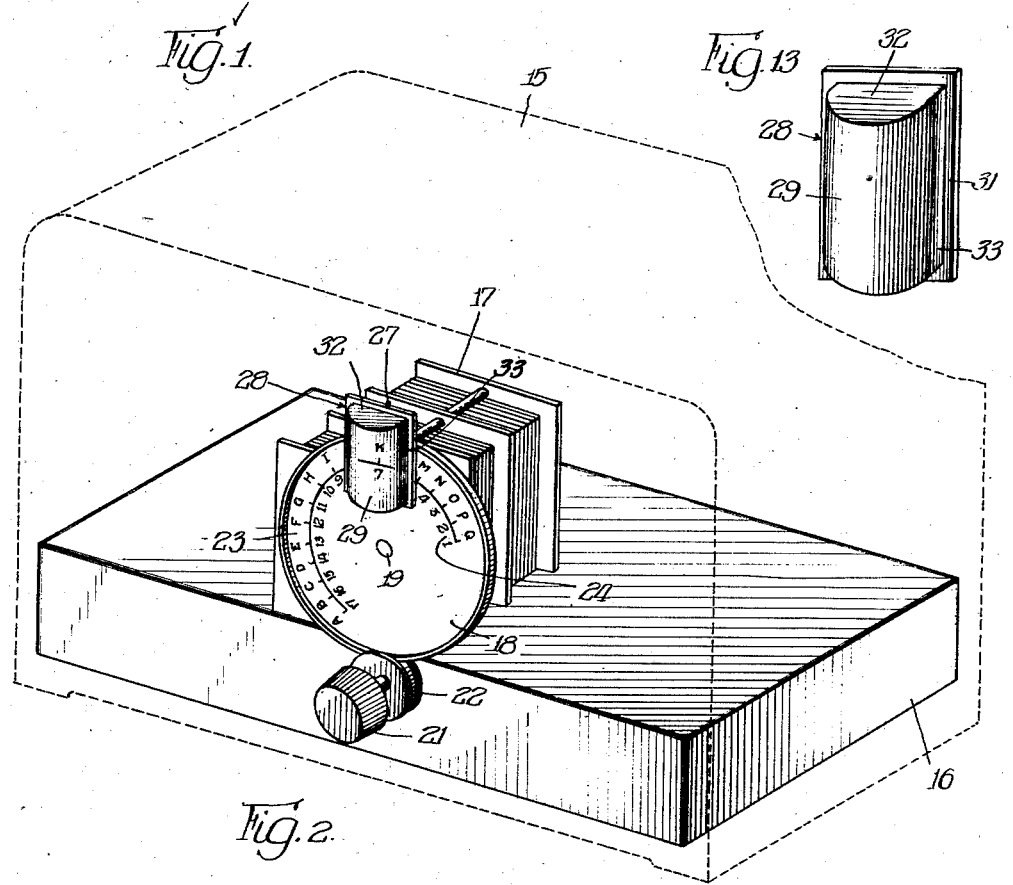
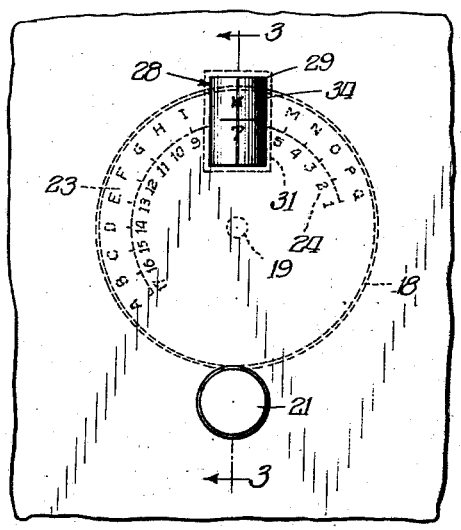
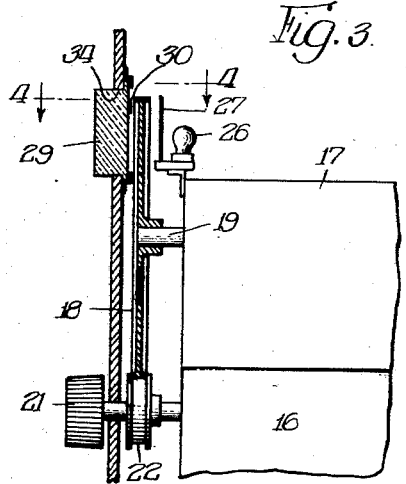
Inventor:
John L. McWeeny,
By Foreman L. Mueller Atty May 17, 1938. J. L. McWEENY 2,117,441
INDICATING AND CONTROL APPARATUS
Filed Nov. 27, 1936 2 Sheets-Sheet 2
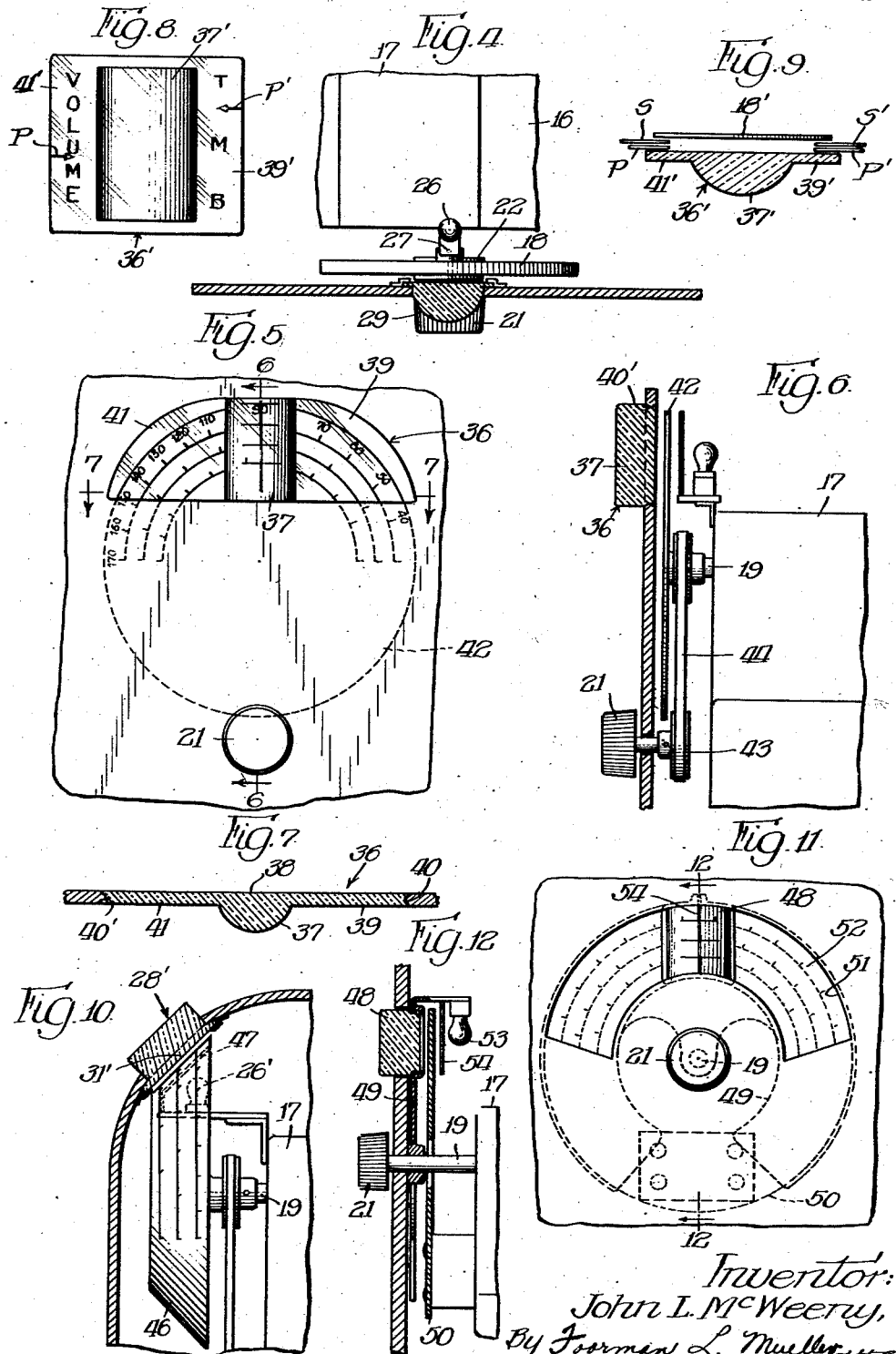
Inventor:
John L. McWeeny,
By Foorman L. Mueller, Atty.

Patented May 17, 1938

2,117,441

UNITED STATES PATENT OFFICE 2,117,441

INDICATING AND CONTROL APPARATUS

John L. McWeeny, Chicago, Ill., assignor to Belmont Radio Corporation, Chicago, Ill., a corporation of Illinois Application November 27, 1936, Serial No. 112,981

10 Claims. (Cl. 116—124.4)

My invention relates in general to indicating and control apparatus, and in particular to the combination of a viewing lens and radio tuning indicating means.

Although the normal manner of reading is along a straight line, from one end of the line to the other, various indicating and control devices have been used in which the scale or indicating subject matter is provided on a dial or other plate in a curved line which of course includes a circular line so that the observer must read such indications out of their normal reading position. Scales and other indicating subject matter are sometimes provided in a straight line on dials or the like, but this ordinarily requires expensive and complicated actuating mechanism for the dials, or necessitates the use of a large amount of space for the indicating subject matter.

It is an object of my invention to provide improved indicating and control apparatus.

A further object is to provide a simplified and improved indicating and control mechanism for radio receivers.

It is also an object of my invention to provide an attractive as well as useful mechanism for easier as well as more accurate reading of a curved scale indicating dial, and therefore provide more accurate control of the mechanism for which the scale serves as an indicating device.

One of the features of my invention is the provision of a cylindrical lens having one curved face and one flat face for viewing a curved line indicating scale, which lens provides to the observer a straight line image of the scale.

A further feature is the provision of a viewing lens for radio tuning dials, which not only changes curved lines of indicating representations to straight line images, but also magnifies such representations so as to make the reading thereof easier and more accurate. In this respect it becomes possible to use smaller indicating representations than normal, and thus reduce the dial size.

A still further feature of my invention is the provision of a viewing lens in combination with an indicating dial or the like, which lens has a central portion for changing a curved line object to a straight line image, and wing portions for observing indicating figures to one side or the other of those viewed through the central portion, which wing portions also may be utilized for imprinting or mounting indicating figures to further show the position or condition of control apparatus operating in conjunction with the indicating figures.

A particular advantage of my invention is that it makes possible the use of simple and inexpensive mechanism adapted for large or small radio receivers, to provide a novel, easy, and accurate tuning scale reading and tuning control.

Other objects, features, and advantages, of my invention will be apparent from the following description, taken with the drawings, in which:

Fig. 1 is a perspective view, partially schematic, illustrating one embodiment of my invention in a table model, or midget-size radio receiver.

Fig. 2 is a front elevation of the tuning and indicating mechanism of Fig. 1.

Fig. 3 is a sectional view along the lines 3—3 of Fig. 2.

Fig. 4 is a plan view partly in section, along the line 4—4 of Fig. 3.

Fig. 5 is a front elevation of a modified embodiment of the invention.

Fig. 6 is a sectional view along the line 6—6 of Fig. 5.

Fig. 7 is a fragmentary sectional view along the line 7—7 of Fig. 5.

Fig. 8 is a front elevation of a further modification, with the viewing lens itself of the combination similar to the lens of Fig. 5.

Fig. 9 is a top plan view, partially fragmentary, of the structure of Fig. 8.

Fig. 10 is a fragmentary side elevation partly in section of a further modification of the invention.

Fig. 11 is a front elevation illustrating another modification employing a stationary dial and movable viewing lens.

Fig. 12 is a sectional view along the line 12—12 of Fig. 11.

Fig. 13 is an enlarged perspective view of the preferred form of the viewing lens.

My invention is embodied in indicating and control apparatus having indicating marks or representations presented in a curved line on a dial plate or the like, and changes the curved line indications to a magnified straight line image to the observer. In the principal embodiments, it includes a dial in connection with control apparatus, as for instance a radio tuning condenser, with control indications in a curved line on the dial. A cylindrical lens is mounted in front of the dial, and has a curved front face and a flat portion at the back face, with the flat portion standing parallel to the face of the indicating dial.

Fig. 1 illustrates a radio cabinet 15 of the socalled midget type, having the usual radio receiver chassis 16 mounted therein, and including a tuning condenser 17. A circular dial 18 is secured to the shaft 19 of the condenser and rotates inside the front wall of the cabinet, upon rotation of the tuning knob 21. The latter is appropriately journalled in the wall of the cabinet 15, and has a friction drive pulley 22 to rotate said dial, and in turn the rotors of the tuning condenser itself.

It is the practice at the present time to include several rows of figures or indications upon a single dial, the number of rows depending upon the number of different ranges of tuning frequency over which the radio receiver is designed to operate. For purposes of illustration, a tuning scale 23 and a similar scale 24 are printed on the dial 18. The dial itself is translucent, and, when illuminated by a pilot light 26 mounted to the rear of the dial, the scales stand out conspicuously. It is understood, however, that either an illuminated or a non-illuminated dial may be employed. Mounted intermediate the dial and light is a vertical pointer or the like 27 which casts a shadow through the dial at the reading position. Suitable shielding means may of course be provided if desired, to concentrate the illumination from the pilot light on a constricted area of the dial.

In all radio receivers, and particularly in the small or midget receivers, it is important not only to conserve space in the cabinet adjacent the chassis, but to provide the simplest possible mechanism throughout to maintain a low manufacturing cost. The simplified indicating and control apparatus of this invention satisfies this requirement. In a commercial embodiment of the invention, a cylindrical viewing lens 28 (Fig. 13) is mounted on the wall of the cabinet, as shown in Figs. 1 to 4. The cylindrical lens 28 comprises a curved front face 29, which in this embodiment of the invention is an arc of 140° on a circle one and one-half inches in diameter, and a flat face 30 at the rear. An integral mounting flange 31 extends around the entire central portion of the lens. The back of the entire lens 28 is two and one-fourth inches by one and seven-sixteenths inches, and five-sixteenths inch thick. The ends 32 of the lens 28 are flat, while flat side walls 33, three-sixteenths inch wide, fit into an aperture 34 in the front face of the cabinet. This lens is preferably mounted approximately one-eighth of an inch away from the dial, with the flat face 31 lying parallel to the face of the dial. Although the preferred lens has a curvature of approximately 140° on the curved face, the degree of curvature may extend from 100° to 300°.

Although considerable latitude is permitted in the curvature and dimensions of the lens and dial assembly for satisfactory reading in any particular structure, it is necessary to vary the curvature of the lens between 100° and 300° as the indicating scales are set out on a dial on the circumferences of circles of varying diameters. The degree of curvature of the lens is decreased from 300° as the indicating scale is spread out. Such a variation in lens design is also necessary with the variation of the curvature of an oval line representation or any other curved line representation. The diameter of the curved line of indicating scales must not be less than the diameter of the circle of which the round portion of the lens is a part. Likewise, it may be necessary to vary slightly the distance that the viewing lens is mounted from the dial, with variations in lens and indicated figure representations as noted above.

As may be noted from the illustration of Fig. 2 particularly, the image appearing to the observer from the lens is smaller than the corresponding area on the dial covered by the flat face of the lens. As an example, with the lens having dimensions as described above placed one-eighth inch from a dial and parallel thereto, the image from the lens is approximately three-fourths inch wide. The scale on the dial follows the circumference of a circle six inches in diameter. In other words, the useful or working area on the curved line representation on the dial is approximately one-third the width of the entire flat face when using a 140° lens, and approximately one-half the one and one-half inch diameter of the curved portion of the lens. The useful area decreases as the curvature of the lens increases from 140°.

As to the mounting of the lens 28, this is desirably accomplished by inserting the extending portion of the lens through the opening 34 in the front wall of the cabinet with side walls 33 and top and bottom edges 32 engaging the edges of the opening. The front face of the encircling flange 31 may be cemented to the back of the cabinet wall, or clips bearing against the flat face 30 may be secured to the wall of the cabinet. It is also contemplated that the lens may be mounted on the chassis by a suitable framework so that the extending portion will fit into the opening 34 as the chassis is inserted in the cabinet.

In the modification illustrated in Figs. 5 to 7, an enlarged one-piece viewing lens 36 is provided, appropriately mounted in the radio receiver cabinet, which lens comprises a central portion having a curved or circular face 37 and a flat face 38 at the rear. To permit the viewing of portions of the dial as they come up to, or recede from, the desired station setting as the dial is rotated, flat integral wing portions 39 and 41 are provided to each side of the curved central portion. As may be seen from the illustration of Fig. 5, the curved line representation on the dial is produced in a magnified straight line image at the position of the station setting, and adjacent thereto, while the normal flat wing portions of the lens show the curved line representations in their normal manner. As illustrated, lens 36 has a channel 40 extending around the same for receiving a bead 40' desirably provided in the case where the lens is molded into the front wall of a molded cabinet.

Fig. 6, which is a cross section of Fig. 5 along the line 6—6, also illustrates a modified driving mechanism for the tuning condenser 17 and dial 42 in providing a pulley on the condenser shaft 19 to which the dial is also secured, and a pulley 43 on the control knob shaft having a belt 44 from one to the other for rotating the dial in the normal manner. It is understood that this type of driving mechanism can be substituted for the tuning drive illustrated in the other figures.

A further modification of the invention is illustrated in Figs. 8 and 9, in which modification a viewing lens 36' similar to the lens 36 (Fig. 5) is employed. Lens 36' has integral flat wing portions 39' and 41' extending from a curved portion 37' similar to portion 37 of lens 36. Many radio receivers at the present time have not only tuning frequency information on the dial, but indicating means of various kinds for indicating volume and tone control for the receiver. As may be seen from the illustration of Fig. 8, the word "Volume" for instance, may be etched or otherwise imprinted on the rear face of the wing portion 41' and the letters "T", "M", and "B", representing the position for tenor, medium, and bass respectively, on the matter of tone control, etched on the rear face of the wing portion 39'. A pointer P is mounted and operated either swinging from a center bearing and moving from top to bottom of the wing portion 41', or the pointer may be mounted and operated to remain in a horizontal plane and move up and down over the indications. The pointer P at the top of the word may indicate a great volume in reproduction, and indicate a decreasing speaker volume as it moves toward the bottom. Pointer P' on the side of the tone control may be similarly mounted and operated. Each pointer operates in combination with the control device for a particular characteristic of the receiver apparatus. Appropriate control knobs are of course provided for this purpose.

Shields S and S' are mounted between the pointers and the dial 18 to provide the necessary color contrast in a background so that the pointers are clearly visible in their movement over the indicating figures.

Radio cabinets with curved or angular front faces have attained considerable popularity, and my invention is applied to such a cabinet by providing a dial 46 in the shape of a frustro-conical open frame as shown in Fig. 10, mounted on the shaft 19 of the condenser 17 and rotatable by a belt or friction drive as previously described. The dial is mounted vertical, and the conical face is provided at an angle such that it is parallel to a flat face 31' of a cylindrical lens 28' corresponding to the lens of Fig. 1. A lens similar to that illustrated in Fig. 5 or 8 may also be provided, if desired. A pilot light 26' is mounted on a bracket extending from the condenser 17, and a stationary indicating pointer 47 is mounted intermediate the dial 46 and lamp 26' to cast a shadow at the tuned station setting.

If it is required that a stationary rather than a movable dial be employed in a particular radio receiver, a straight line image from a curved line object or tuning scale may be obtained by the use of a movable lens 48 as shown in Figs. 11 and 12. In this particular embodiment the lens is mounted on a movable carriage 49 secured to the shaft 19 of the condenser 17 and rotatable as the tuning condenser shaft is rotated, by means of the knob 21 so that the lens moves over the entire tuning scale or scales on the dial 50. The lens 48 mounted on the carriage 49 is movable in a slot 51 cut in the front face of the cabinet, and if it is desired to concentrate the observer's attention on a small portion of the scale, integral wings 52 may be provided to each side of the lens on the carriage and extended to such a length that they will close the slot 51 to one side or the other of the lens, depending on the direction in which the lens is rotatably moved over the face of the dial. A pilot light 53 is appropriately mounted on a bracket extending from the carriage 49, above the stationary dial 50, and an indicating pointer 54 extends downwardly between the pilot light and dial. The magnified straight line image of the curved line tuning scale in this embodiment of the invention, is at right angles to the vertical axis of the lens, and remains in this position as the lens is moved over the face of the stationary dial. Easier, as well as more accurate, reading of the curved line tuning scale or scales is provided with this embodiment, than is possible simply with a stationary circular or oval dial and a movable pointer.

Although the invention has been illustrated and described in its preferred embodiments, it is understood that it is not limited thereto, nor to radio receiver indicating and control apparatus, but may be applied to any indicating device with curved lines of indicating representations. The claims are intended to point out novel features and not to limit the invention except as may be required by the prior art.

I claim:

1. Radio tuning apparatus including a stationary dial having tuning readings in a curved line thereon, rotatable tuning means having a pointer operable upon movement of said tuning means to indicate the tuning position thereof, and a transparent viewing lens supported for movement over the curved line of tuning readings for changing the curved line of tuning readings indicating the tuning position to a substantially straight line of tuning readings at any position of the lens in front of the dial.

2. Radio tuning apparatus including a stationary dial having tuning readings in a curved line thereon, rotatable tuning means having a pointer operable upon movement of said tuning means to indicate the tuning position thereof, and a cylindrical lens having a curved front face and a flat back face, with the latter substantially parallel to the dial, and a movable carriage for supporting said lens to move it over the tuning readings, whereby to change the curved line of tuning readings adjacent the indicated tuning position to a substantially straight line image thereof.

3. A viewing lens for indicating apparatus for use with control devices, comprising a one-piece glass member having a body portion with a curved front face and a flat rear face, and an outwardly extending mounting flange at the rear of the lens, with said lens acting to change a curved line of figures as an object, to a straight line of figures as the image.

4. Indicating and control apparatus for a radio receiver, including variable means for controlling tuning frequency, reproducing volume, and reproducing tone for said radio receiver, figure representations for indicating the position of each of said variable control means, and a lens for viewing said representations having a central reading portion, and an extension on each of two sides thereof, with said reproducing volume indications on one extension, and said reproducing tone indications on the other of said extensions, and a pointer movable to the rear of each of said extensions, operating in conjunction with the control means related to the particular figure indications.

5. A radio receiver including a cabinet having an aperture in the front wall thereof, a radio receiver chassis mounted in said cabinet having variable tuning means thereon, a movable dial operating with said tuning means, and having a plurality of tuning indications in a curved line thereon, a viewing lens mounted on the front wall of said cabinet in front of said dial, having a portion extending into said front wall aperture, with a curved front face for changing the tuning indications on the dial from a curved line object at the tuned position, to a substantially straight line image, and a flange at the rear of said lens for mounting on the wall of the cabinet adjacent said aperture to rigidly support said lens.

6. Radio tuning apparatus including movable tuning means, a translucent tuning indicating plate having indicating figures in a curved line path thereon, a viewing lens mounted in front of said plate for magnifying said figures and changing the curved line of indicating figures to a substantially straight line image thereof, a light mounted to the rear of said plate and an indicating pointer carried intermediate said light and plate to provide a shadow thereon, and indicate the tuned position of the tuning apparatus.

7. Tuning apparatus for a radio receiver including a stationary dial having tuning indications in a curved line thereon, movable supporting means rotatable in an arc corresponding to the curved line of tuning indications and a viewing lens positioned with its longitudinal axis corresponding to the radius of said arcuate path carried by said supporting means for arcuate movement over the face of the dial, with said lens having a curved face acting to change the curved line of tuning indications into a substantially straight line image to the eye of the observer in front of the lens, and means acting to indicate at the lens the tuned position of the tuning apparatus.

8. In a radio receiver, variable tuning means, and a dial having a tuning scale provided in a curved line path on said dial, a one-piece viewing lens for mounting in front of the dial having a central body portion with a curved front face and a flat rear face acting to change the curved line of the tuning scale into a straight line image to the operator in front of the lens, and integral side flanges on the body portion and at the rear portion thereof for mounting the lens on the radio receiver.

9. A radio receiver comprising a molded cabinet having a dial viewing opening in the front wall thereof, tuning and indicating apparatus for the radio receiver including an indicating dial mounted within said cabinet to the rear of the viewing opening, and a glass cover for said opening secured therein upon molding of the cabinet, with an interengaging channel and bead structure on said opening edges and glass for retaining the glass in the cabinet.

10. The combination with a molded cabinet for a radio receiver having a viewing opening in the front face thereof, of tuning indicating means including a dial with a curved face and a tuning scale on such curved face to appear normally as being provided in a curved path, with said dial being mounted rearwardly of the viewing opening, and a viewing lens in said opening of such configuration as to change the dial scale from a normally appearing curved path object to a straight path image, and interengaging flange and groove structure on said opening edges in the cabinet and lens edges for retaining the lens molded into said cabinet.

JOHN L. McWEENY.